United States Patent [19]

Hisamoto et al.

[11] Patent Number: 4,517,108
[45] Date of Patent: May 14, 1985

[54] CLEANING COMPOSITION

[75] Inventors: Iwao Hisamoto, Suita; Yukio Omure, Takatsuki; Sueyoshi Ishikawa, Kishiwada, all of Japan

[73] Assignee: Daikin Kogyo Co., Ltd., Osaka, Japan

[21] Appl. No.: 535,095

[22] Filed: Sep. 23, 1983

[30] Foreign Application Priority Data

Sep. 27, 1982 [JP] Japan ................... 57-169118

[51] Int. Cl.³ ............................................. C11D 7/30
[52] U.S. Cl. ................................. 252/162; 252/127; 252/172; 252/DIG. 9; 134/39; 134/40
[58] Field of Search ............... 252/171, DIG. 9, 162; 134/38, 39, 40; 252/127

[56] References Cited

U.S. PATENT DOCUMENTS 3,694,368  9/1972  Barton et al. .................. 252/171
3,737,389  6/1973  Clark et al. .................... 252/171
3,785,987  1/1974  Schofield et al. .............. 252/171
3,789,005  1/1974  McMillan et al. .............. 252/171
3,833,507  9/1974  Schofield et al. .............. 252/171
4,279,664  7/1981  Figiel et al. ................... 252/171
4,378,303  3/1983  Hisamoto et al. .............. 252/171

*Primary Examiner*—Paul Lieberman
*Assistant Examiner*—Hoa Van Le
*Attorney, Agent, or Firm*—Armstrong, Nikaido, Marmelstein & Kubovcik

[57] ABSTRACT

A cleaning composition containing 1,1,2,2-tetrachloro-1,2-difluoroethane, 1,1,2-trichloro-1,2,2-trifluoroethane and at least one other organic solvent having a melting point of not more than 15° C. and a boiling point of 40° to 150° C. and capable of forming an azeotrope with at least one of said 1,1,2,2-tetrachloro-1,2-difluoroethane and 1,1,2-trichloro-1,2,2-trifluoroethane.

5 Claims, No Drawings

CLEANING COMPOSITION

BACKGROUND OF THE INVENTION

The present invention relates to a cleaning composition, and more particularly to a cleaning composition suitable for removing letters or marks written by dry ink markers, oils, fats, greases and polar substances from surfaces of rubbers, plastics and metals, and for removing flux residues from printed-circuit boards.

1,1,2,2-Tetrachloro-1,2-difluoroethane (hereinafter referred to as "flon-112") which has hitherto been used in a cleaning composition, is non-flammable and of low toxicity, and has the feature of dissolving oils, fats or greases without attacking materials to be cleaned, e.g. polymeric materials such as rubbers and plastics, and metals. However, flon-112 has the disadvantages in that it solidifies on the surface of materials to be cleaned, when used alone at room temperature, because of having a high melting point, i.e. 26° C., and an ability of removing polar substances such as glycols and inorganic salts that is insufficient.

1,1,2-Trichloro-1,2,2-trifluoroethane (hereinafter referred to as "flon-113") which is a compound analogous to flon-112 and has advantages similar to flon-112, has no defect related to solidification on the surface of materials to be cleaned, since its melting point is low, i.e. −35° C. However, since flon-113 has a low boiling point, thus is volatile, the surface of materials to be cleaned is cooled in excess by vaporization and accordingly condensation of moisture is takes place easily on the surface. For instance, this may cause corrosion of metals, particularly active metals such as zinc, aluminum and magnesium, and alloys containing these metals. Also, flon-113 does not remove polar substances as well as flon-112.

It is effective to use flon-112 in combination with flon-113 for the purpose of preventing solidification of flon-112. Such a flon-112/flon-113 mixed solvent is non-flammable and of low toxicity, and has similar advantages to those obtained by the single use of flon-112 or flon-113 in that the mixed solvent dissolves oils, fats or greases without attacking materials to be cleaned such as metals and polymeric materials. However, the flon-112/flon-113 mixed solvent is insufficient in its ability of removing polar substances such as glycols and inorganic salts, flux, letters and marks written by dry ink markers, and rust preventive oils. Moreover, the defect inherent in flon-112 due to its solidification on the surface of materials to be cleaned is eliminated to some extent in the mixed solvent, but insufficiently because flon-113 evaporates faster than flon-112 to leave large amounts of flon-112.

It is an object of the present invention to provide a cleaning composition which is non-flammable and has an improved cleaning power.

A further object of the present invention is to provide a non-flammable cleaning composition which has an improved cleaning power, and moreover which does not cause flon-112 to remain on the surface of materials to be cleaned and does not cause condensation of moisture (moisture absorption) on the surface of materials to be cleaned.

These and other objects of the present invention will become apparent from the description hereinafter.

SUMMARY OF THE INVENTION

In accordance with the present invention, there is provided a cleaning composition consisting essentially of 1,1,2,2-tetrachloro-1,2-difluoroethane, 1,1,2-trichloro-1,2,2-trifluoroethane and at least one other organic solvent having a melting point of not more than 15° C. and capable of forming an azeotrope with at least one of said 1,1,2,2-tetrachloro-1,2-difluoroethane and 1,1,2-trichloro-1,2,2-trifluoroethane.

DETAILED DESCRIPTION

The ratio of flon-112 to flon-113 is selected from 20:80 to 80:20 by weight, preferably from 40:6: to 70:30 by weight. When the proportion of flon-112 is less than 20, the volatility of the cleaning composition increases and consequently excess cooling of the surface of materials to be cleaned due to the heat of vaporization occurs easily, thus resulting in moisture absorption, and a decrease in the dissolving power of the cleaning solution. When the proportion of flon-112 is more than 80, there is a tendency for flon-112 to solidify on the surface of materials to be cleaned.

The cleaning composition of the present invention contains at least one other organic solvent having a melting point of not more than 15° C., preferably not more than 5° C., and a boiling point of 40° to 150° C., preferably 70° to 130° C. Organic solvents capable of forming an azeotrope with at least one of flon-112 and flon-113 are preferably employed in the present invention, since the cleaning composition becomes easy to evaporate, thus causing no solidification of flon-112 on the surface of materials to be cleaned. Examples of the organic solvents capable of forming an azeotrope with flon-112 are, for instance, methanol, ethanol, n-propanol, iso-propanol, n-butanol, iso-butanol, sec-butanol, tert-butanol, tert-pentanol, allyl alcohol, nitromethane, nitroethane, nitropropane, tert-amyl alcohol, n-heptane, heptene-1, acetonitrile, propionitrile, n-butyronitrile, 1,4-dioxane, epichlorohydrin, ethylene glycol monomethyl ether, ethyl acetate, n-propyl acetate, iso-propyl acetate, methyl ethyl ketone, methyl propyl ketone, methyl isopropyl ketone, dichloroethane, trichloroethylene and ethylene dichloride. Examples of the organic solvents capable of forming an azeotrope with flon-113 are, for instance, methanol, ethanol, iso-propanol, tert-butanol, acetone, acetonitrile, methylene chloride, nitromethane, methylal, methyl acetate, dichloroethane, tetrachloroethylene and 1,1,1-trichloroethane. The organic solvents capable of forming an azeotrope with flon-112 are particularly preferred.

The content of the organic solvent in the cleaning composition of the invention is preferably from 1 to 15% by weight. The cleaning power is improved by the addition of the organic solvent, but when the content of the organic solvent is less than 1% by weight, the cleaning power is insufficient and letters or marks written by dry ink markers, flux on printed-circuit boards, rust preventive oils (e.g. rust preventive oils of NP-2, NP-3 or NP-4 type provided in Japanese Industrial Standards (JIS) K 2246), or polar substances, are not effectively removed. Moreover, since flon-113 evaporates faster, flon-112 remains and solidifies to form a film on the surface to be cleaned upon vaporization of the composition. When the content of the organic solvent is more than 15% by weight, the cleaning composition has an ignitability if the solvent is flammable, or the composition absorbs moisture easily, thus causing moisture to remain on the surface of materials to be cleaned if the solvent is water-miscible.

The cleaning composition of the present invention is non-flammable and accordingly can be safely used. Moreover, it has an improved cleaning power, and even letters and marks written by dry ink markers, polar substances and rust preventive oils can be effectively removed. Further, the composition of the invention does not cause such a phenomenon wherein flon-113 evaporates in preference to flon-112 and flon-112 remains on the surface of materials to be cleaned. Also, since the composition has an adequate volatility, condensation of moisture (absorption of moisture) by excess cooling of the surface of materials to be cleaned due to vaporization of the composition hardly occurs. Even if a part of the composition remains on the surface of materials to be cleaned without evaporating, it remains in liquid form without solidification at room temperature as observed with a flon-112/flon-113 mixed solvent.

The present invention is more specifically described and explained by means of the following Examples, in which all % are by weight.

It is to be understood that the present invention is not limited to the Examples, and various changes and modifications may be made in the invention without departing from the spirit and scope thereof.

EXAMPLES 1 TO 7 AND COMPARATIVE EXAMPLES 1 TO 6

Cleaning of letters written on a steel plate by a dry ink marker and of a rust preventive oil (JIS K 2246 NP-4 type mentioned before) applied onto a steel plate for temporary rust prevention was conducted in the following manner by employing cleaning compositions shown in Table 1.

In a 500 ml. beaker was placed 500 ml. of a cleaning composition of 23° C. A steel plate lettered with the dry ink marker and a steel plate coated with the rust preventive oil were immersed in the composition for 30 seconds and taken out. The extent of removal of the letters and the rust preventive oil and the degree of evaporation of the composition on the steel plate were observed by the naked eye.

The results are shown in Table 1.

The boiling points and melting points of the organic solvents used in the Examples and Comparative Examples are shown below.

|  | b.p. (°C.) | m.p. (°C.) |
|---|---|---|
| Methanol | 64.8 | −97.8 |
| Ethanol | 78.3 | −114.1 |
| Methyl propyl ketone | 102 | −78 |
| Methylene chloride | 40 | −96.7 |
| Ethylene glycol monomethyl ether | 124.6 | −85.1 |
| 1,4-Dioxane | 101.3 | 11.8 |
| Pentane | 36.1 | −129.7 |
| n-Decane | 174 | −30 |
| tert-Butanol | 82.9 | 25.5 |

In addition to the ingredients used in the Examples, other ingredients can be used in the Examples as set forth in the specification to obtain substantially the same results.

TABLE 1

| | Cleaning composition | (%) | Removal of dry ink marker | Removal of rust preventative oil | Degree of evaporation on steel plate |
|---|---|---|---|---|---|
| Ex. 1 | Flon-112<br>Flon-113<br>Ethanol | (54)<br>(36)<br>(10) | good | good | Evaporating and drying in 5–10 sec. (no moisture formed) |
| Ex. 2 | Flon-112<br>Flon-113<br>Methyl propyl ketone | (47.5)<br>(47.5)<br>(5) | good | good | Evaporating and drying in 5–10 sec. (no moisture formed) |
| Ex. 3 | Flon-112<br>Flon-113<br>Ethanol | (48)<br>(32)<br>(20) | good | good | Slow drying due to slow evaporation of flon-112 and ethanol (a slight moisture formed) |
| Ex. 4 | Flon-112<br>Flon-113<br>Methylene chloride | (36)<br>(54)<br>(10) | good | good | Evaporating and drying in 5–12 sec. (little moisture formed) |
| Ex. 5 | Flon-112<br>Flon-113<br>Methanol | (42.5)<br>(42.5)<br>(15) | good | good | Evaporating and drying in 10–15 sec. (little moisture formed) |
| Ex. 6 | Flon-112<br>Flon-113<br>Ethylene glycol monomethyl ether | (54)<br>(36)<br>(10) | good | good | Evaporating and drying in 15–25 sec. (no moisture formed) |
| Ex. 7 | Flon-112<br>Flon-113<br>1,4-Dioxane | (38)<br>(57)<br>(5) | good | good | Evaporating and drying in 10–15 sec. (no moisture formed) |
| Com. Ex. 1 | Flon-112<br>Flon-113 | (60)<br>(40) | good | good | Formation of film of solidified flon-112 |
| Com. Ex. 2 | Flon-112<br>Methyl propyl ketone | (90)<br>(10) | good | slightly bad | — |
| Com. Ex. 3 | Flon-113<br>Ethanol | (90)<br>(10) | good | good | Slow drying due to slow evaporation of ethanol (moisture formed) |
| Com. Ex. 4 | Flon-112<br>Flon-113<br>Pentane | (36)<br>(54)<br>(10) | bad | bad | Formation of film of solidified flon-112 (a little moisture formed) |
| Com. Ex. 5 | Flon-112<br>Flon-113 | (36)<br>(54) | bad | slightly bad | Slow drying due to slow evaporation of flon-112 and |

TABLE 1-continued

| | Cleaning composition | (%) | Removal of dry ink marker | Removal of rust preventative oil | Degree of evaporation on steel plate |
|---|---|---|---|---|---|
| Com. Ex. 6 | n-Decane<br>Flon-112<br>Flon-113<br>t-Butanol | (10)<br>(36)<br>(54)<br>(10) | good | good | n-decane<br>Slow drying due to slow evaporation of flon-112 and t-butanol (moisture formed) |

What we claim is:

1. A method for cleaning a surface of a material with the improvement that essentially no moisture is formed over the cleaned surface, using a composition consisting essentially of 1,1,2,2-tetrachloro-1,2-difluoroethane, 1,1,2-trichloro-1,2,2-trifluoroethane and 1 to 15% by weight of at least one other organic solvent having a melting point of not more than 15° C. and a boiling point of 40° to 150° C. and capable of forming an azeotrope with at least one of said 1,1,2,2-tetrachloro-1,2-difluoroethane and 1,1,2-trichloro 1,2,2-trifluoroethane, the ratio of 1,1,2,2-tetrachloro-1,2-difluoroethane to 1,1,2-trichloro-1,2,2-trifluoroethane being from 20:80 to 80:20 by weight.

2. The method of claim 1, wherein the ratio of 1,1,2,2-tetrachloro-1,2-difluoroethane to 1,1,2-trichloro-1,2,2-trifluoroethane is from 40:60 to 70:30 by weight.

3. The method of claim 1, wherein said organic solvent is a member selected from the group consisting of ethanol, methyl propyl ketone, ethylene glycol monomethyl ether and 1,4-dioxane.

4. The method of claim 1, wherein said organic solvent is one capable of forming an azeotrope with 1,1,2,2-tetrachloro-1,2-difluoroethane.

5. A method for cleaning a surface of a material with the improvement that no moisture is formed over the cleaned surface, using a composition consisting essentially of 1,1,2,2-tetrachloro-1,2-difluoroethane, 1,1,2-trichloro-1,2,2-trifluoroethane and 5 to 10% by weight of at least one other organic solvent having a melting point of not more than 25° C. and a boiling point of 40° to 150° C. and capable of forming an azeotrope with at least one of said 1,1,2,2-tetrachloro-1,2-difluoroethane and 1,1,2-trichloro-1,2,2-trifluoroethane, the ratio of 1,1,2,2-tetrachloro-1,2-difluoroethane to 1,1,2-trichloro-1,2,2-trifluoroethane being from 38:57 to 54:36 by weight.

* * * * *